(12) United States Patent
Sukhwani et al.

(10) Patent No.: US 8,805,850 B2
(45) Date of Patent: Aug. 12, 2014

(54) HARDWARE-ACCELERATED RELATIONAL JOINS

(75) Inventors: Bharat Sukhwani, Briarcliff Manor, NY (US); Sameh W. Asaad, Briarcliff Manor, NY (US); Hong Min, Poughkeepsie, NY (US); Mathew S. Thoennes, West Harrison, NY (US); Gong Su, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 13/478,507

(22) Filed: May 23, 2012

(65) Prior Publication Data
US 2013/0318067 A1 Nov. 28, 2013

(51) Int. Cl.
*G06F 17/30* (2006.01)
(52) U.S. Cl.
USPC ............................ 707/747; 707/698; 707/714
(58) Field of Classification Search
USPC .......................................... 707/698, 714, 747
See application file for complete search history.

(56) References Cited

U.S. PATENT DOCUMENTS

| | | | |
|---|---|---|---|
| 5,960,428 A * | 9/1999 | Lindsay et al. ........ | 707/999.003 |
| 7,577,667 B2 | 8/2009 | Hinshaw et al. | |
| 8,345,685 B2 * | 1/2013 | Shavitt et al. ................. | 370/392 |
| 2003/0120647 A1 * | 6/2003 | Aiken et al. ...................... | 707/3 |
| 2004/0230696 A1 * | 11/2004 | Barach et al. ................. | 709/238 |
| 2005/0125681 A1 * | 6/2005 | Bressy et al. .................. | 713/189 |
| 2005/0195832 A1 * | 9/2005 | Dharmapurikar et al. ......................... | 370/395.31 |
| 2007/0079051 A1 * | 4/2007 | Tanaka et al. .................. | 711/100 |
| 2007/0286194 A1 * | 12/2007 | Shavitt et al. ................. | 370/392 |
| 2008/0189239 A1 | 8/2008 | Bawa et al. | |
| 2008/0189251 A1 * | 8/2008 | Branscome et al. ............. | 707/3 |
| 2008/0189252 A1 * | 8/2008 | Branscome et al. ............. | 707/3 |
| 2009/0083219 A1 | 3/2009 | Zane et al. | |
| 2010/0005077 A1 | 1/2010 | Krishnamurthy et al. | |
| 2010/0082648 A1 * | 4/2010 | Potapov et al. ............... | 707/756 |
| 2010/0098081 A1 * | 4/2010 | Dharmapurikar et al. .... | 370/392 |
| 2011/0119249 A1 * | 5/2011 | Flatz et al. ..................... | 707/714 |
| 2011/0173237 A1 | 7/2011 | Hill et al. | |

OTHER PUBLICATIONS

J-B. Qian et al., "FPGA Acceleration Window Joins Over Multiple Data Streams," Journal of Circuits, Systems and Computers (JCSC), Oct. 2005, pp. 813-830, vol. 14, No. 4.
"Hash Join," http://en.wikipedia.org/wiki/Hash_join, May 2012, 4 pages.

(Continued)

*Primary Examiner* — Phong Nguyen
(74) *Attorney, Agent, or Firm* — Anne V. Dougherty; Ryan, Mason & Lewis, LLP

(57) ABSTRACT

Techniques are provided for hardware-accelerated relational joins. A first table comprising one or more rows is processed through a hardware accelerator. At least one join column in at least one of the one or more rows of the first table is hashed to set at least one bit in at least one bit vector. A second table comprising one or more rows is processed through a hardware accelerator. At least one join column in at least one of the one or more rows of the second table is hashed to generate at least one hash value. At least one bit vector is probed using the at least one hash value. A joined row is constructed responsive to the probing step. The row-construction step is performed in the hardware accelerator.

20 Claims, 7 Drawing Sheets

(56) References Cited

OTHER PUBLICATIONS

"Field-Programmable Gate Array," http://en.wikipedia.org/wiki/Field-programmable_gate_array, May 2012, 13 pages.

"Join (SQL)", http://en.wikipedia.org/wiki/Equijoin#Equi-join, May 2012, 15 pages.

U.S. Appl. No. 13/149,180 filed in the name of V. Sheinin et al. on May 31, 2011 and entitled "Accelerated Join Process in Relational Database Management System."

* cited by examiner

HARDWARE-ACCELERATED RELATIONAL JOINS

FIELD

The field of the invention relates to hash joins for database management systems (DBMS) and, more particularly, to hardware-accelerated hash joins for DBMS.

BACKGROUND

Relational join is a common operation in complex query processing in DBMS. Equijoin is a frequently used type of relational join. Equijoin may be implemented using a number of different algorithms. Hash-join is one of the most efficient and commonly applied algorithms for equijoin. Hash-join is a highly parallel algorithm, and may be implemented in part using software and/or hardware.

Modern databases, such as those used for processing business data, typically must handle large numbers of complex queries. Business data in these databases may comprise information relating to customers, products, orders, employees, etc. Complex queries of such business data can be computationally expensive. For example, queries relating to a particular customer's order history or purchased products or queries relating to which employees processed a particular order, may need to be performed continuously. Such complex queries may seek information which is contained in more than one table of a database. In such cases, relational join operations are performed to handle the query. The amount of business data which is queried can lead to computationally expensive relational join operations.

SUMMARY

Embodiments of the invention provide techniques for hardware-accelerated relational joins.

For example, in one embodiment, a method comprises the following steps. A first table comprising one or more rows is processed through a hardware accelerator. At least one join column in at least one of the one or more rows of the first table is hashed to set at least one bit in at least one bit vector. A second table comprising one or more rows is processed through a hardware accelerator. At least one join column in at least one of the one or more rows of the second table is hashed to generate at least one hash value. At least one bit vector is probed using the at least one hash value. A joined row is constructed responsive to the probing step. The row-construction step is performed in the hardware accelerator.

Further embodiments of the invention comprise one or more of the following features.

The hardware accelerator is a field programmable gate array (FPGA).

At least one of the hashing steps is performed using hardware accelerated hashing.

The hashing (building), probing and row-construction steps are performed in a single pass through the second table.

At least one of the hashing steps is performed using multiple hash functions. The multiple hash functions comprise a Bloom filter approach.

Two or more of the rows and/or join columns are hashed in parallel in at least one of the first and second tables.

The bit vectors are stored in memory banks of the hardware accelerator.

Advantageously, one or more embodiments of the invention allow for hardware-accelerated relational joins using a hash join algorithm.

These and other embodiments of the invention will become apparent from the following detailed description of illustrative embodiments thereof, which is to be read in connection with the drawings.

DETAILED DESCRIPTION

Illustrative embodiments of the invention may be described herein in the context of an illustrative method of hardware-accelerated relational joins in a database. However, it is to be understood that embodiments of the invention are not limited to the illustrative database or methods described but are more broadly applicable to other suitable methods, databases, data storage systems and joining processes.

Illustrative embodiments provide advantages relative to conventional techniques by utilizing hardware-accelerated hash joins. For example, hash join is a highly parallel algorithm which is well suited to hardware implementation. Hash join is a particularly effective method of performing table-join operations. Other techniques include nested loop join algorithms, which perform direct "all-to-all" comparisons of two or more tables and sort-merge join, which performs "compare and jump" on two or more tables. Nested loop join algorithms are computationally expensive and have $O(N^2)$ complexity. Sort-merge join requires expensive sorting of one of the tables and has $O(N\log N)$ complexity. Hash joins are fast but approximate and false positives are possible. Hash join is the most efficient and commonly applied algorithm for equijoin operations, as it requires looking at one or a few positions to determine presence in an entire table. Hash join has $O(N)$ complexity. Hash join may be implemented in software or hardware.

For software implementations of hash join, however, the processing speed is limited by the effective speed of the general purpose processor. In addition, cache miss cycles and/or latency add a significant cost to the hash join operation. The parallelism of software hash join implementations is limited by the number of available hardware threads as well as parallel memory lookups.

In one example of hardware implementation, hash joins are performed using bit-join based filtering on a FPGA. A bit-vector is generated based on the small table. As rows of the large table are streamed in to the FPGA, lower-order bits of the column of interest are used to look-up a bit in bit vector and decide if the row of the large table qualifies for further processing by the host or general purpose processor. In illustrative embodiments of the present invention, the actual join operations are performed in a hardware accelerator, which provides improved performance and lower power consumption. Moreover, in embodiments of the current invention, hash values are generated using one or more hash functions as opposed to simply using the lower order bits of the column as the hash, which may result in uneven hash distribution and potentially a large number of hash collisions.

Figure 1:
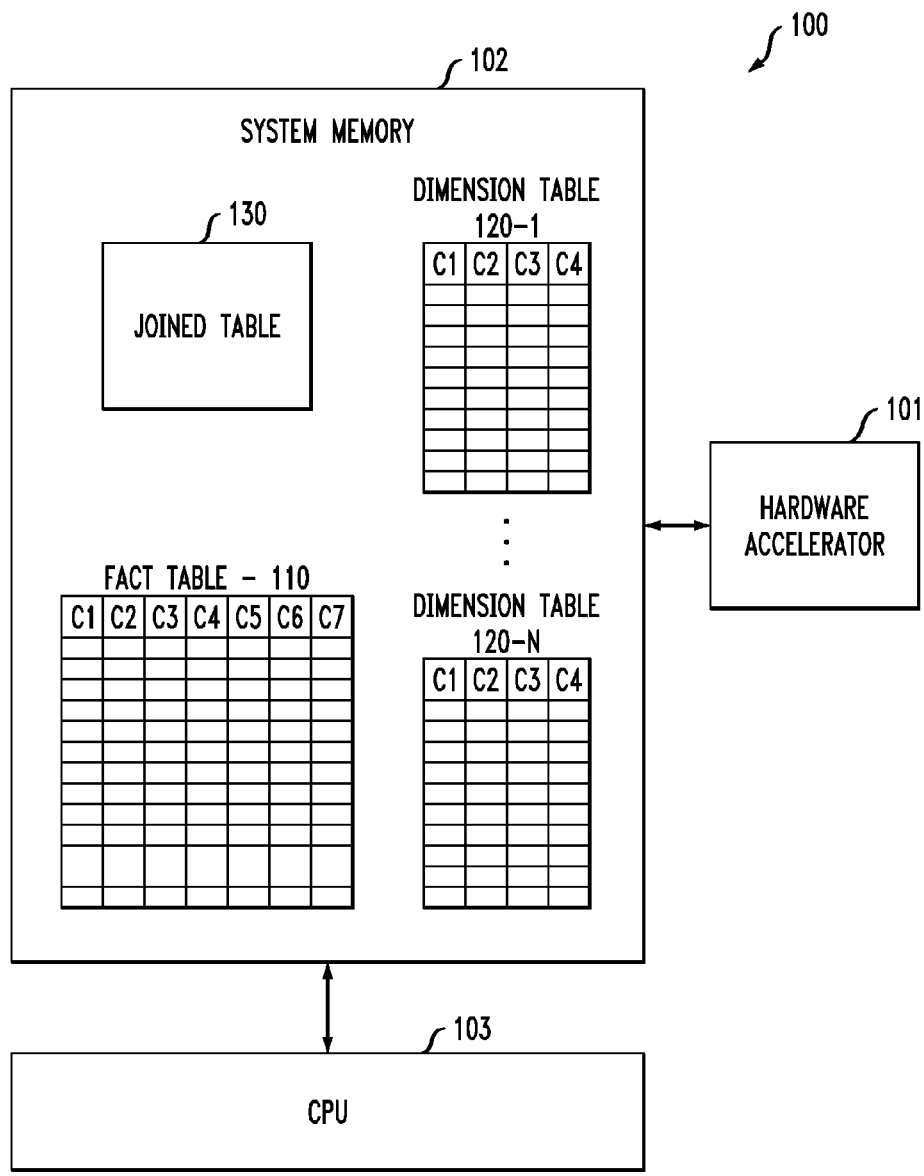
FIG. 1 illustrates a system organization, according to an embodiment of the invention.

In one or more illustrative embodiments, one or more tables are processed by a hardware accelerator. The hardware accelerator may be a FPGA. FIG. 1 depicts one arrangement 100 of a hardware accelerator 101, a system memory 102 and a CPU 103. As shown in FIG. 1, the hardware accelerator 101 can read from and write to the system memory 102. The system memory 102 may comprise, for example, a fact table 110 and one or more dimension tables 120. The terms "large table" and "larger table" as used herein refer to fact table 110. The terms "small table" and "smaller table" as used herein refer to one or more dimension tables 120. The hardware accelerator may read fact table 110 and one or more dimension tables 120 from the system memory, perform a join operation, and write a joined table 130 to the system memory. The CPU 103 is operative to read from and write to the system memory 102 as well.

Figure 2:
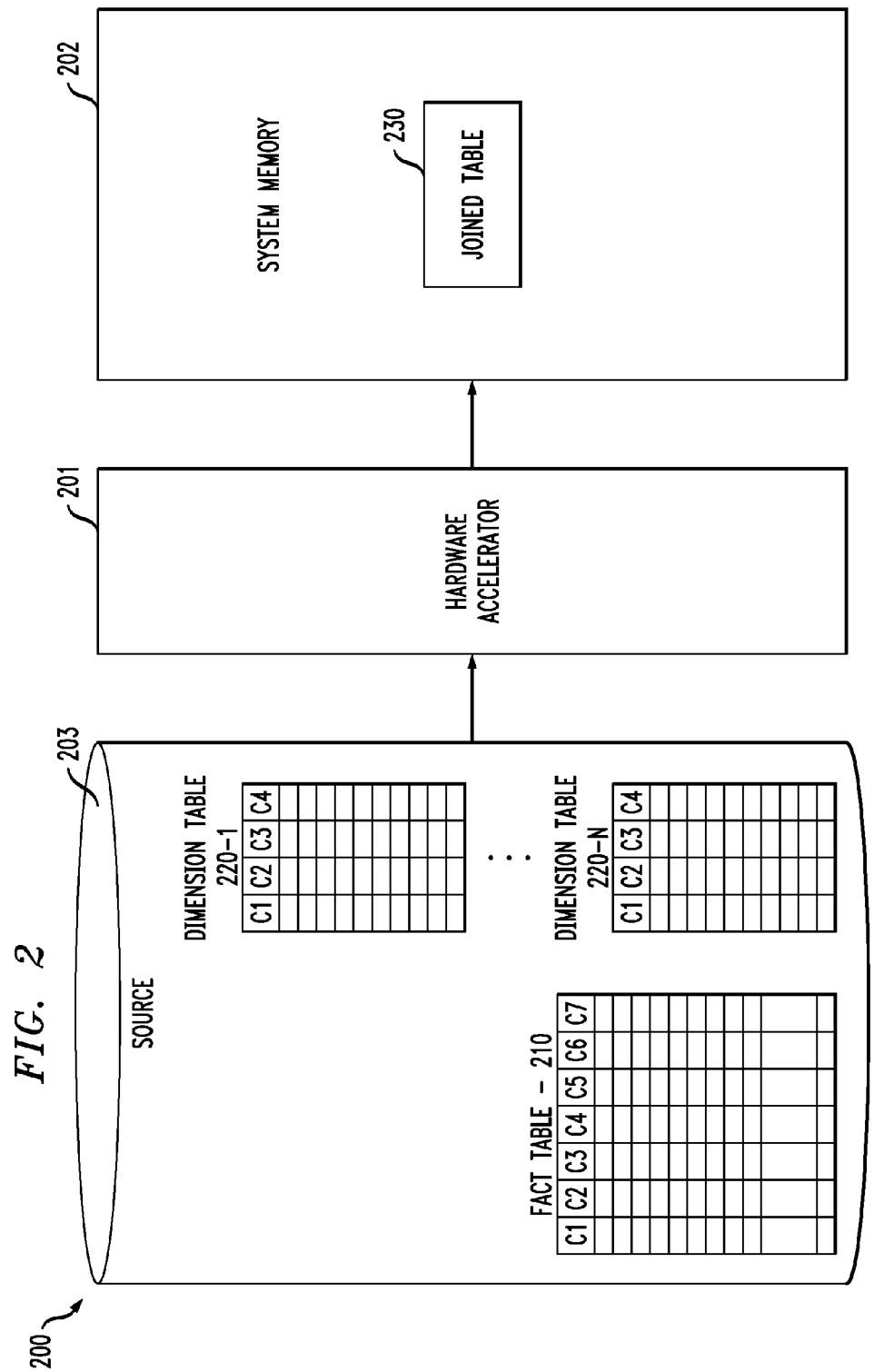
FIG. 2 illustrates an alternate system organization, according to an embodiment of the invention.

FIG. 2 illustrates an alternate arrangement 200 of a hardware accelerator 201, system memory 202 and a source 203. The hardware accelerator may read a fact table 210 and one or more dimension tables 220 from source 203. Source 203 may be any type of local or remote storage memory, including a hard disk, RAM (random access memory), ROM (read only memory), data stored on an intranet or internet server or storage device, etc. The hardware accelerator is operative to perform a join operation on the fact table 210 and one or more dimension tables 220 and to write a joined table 230 to system memory 202. A CPU (not explicitly shown in FIG. 2) may read the joined table 230 from system memory 202.

It is to be appreciated that FIGS. 1 and 2 show only two of a plurality of possible arrangements. One skilled in the art would readily appreciate that many other arrangements are possible, which may include one or more of the elements shown in FIGS. 1 and 2 as well as other elements. For example, arrangements may have more than one hardware accelerator, system memory, CPU, source, etc.

Figure 3:
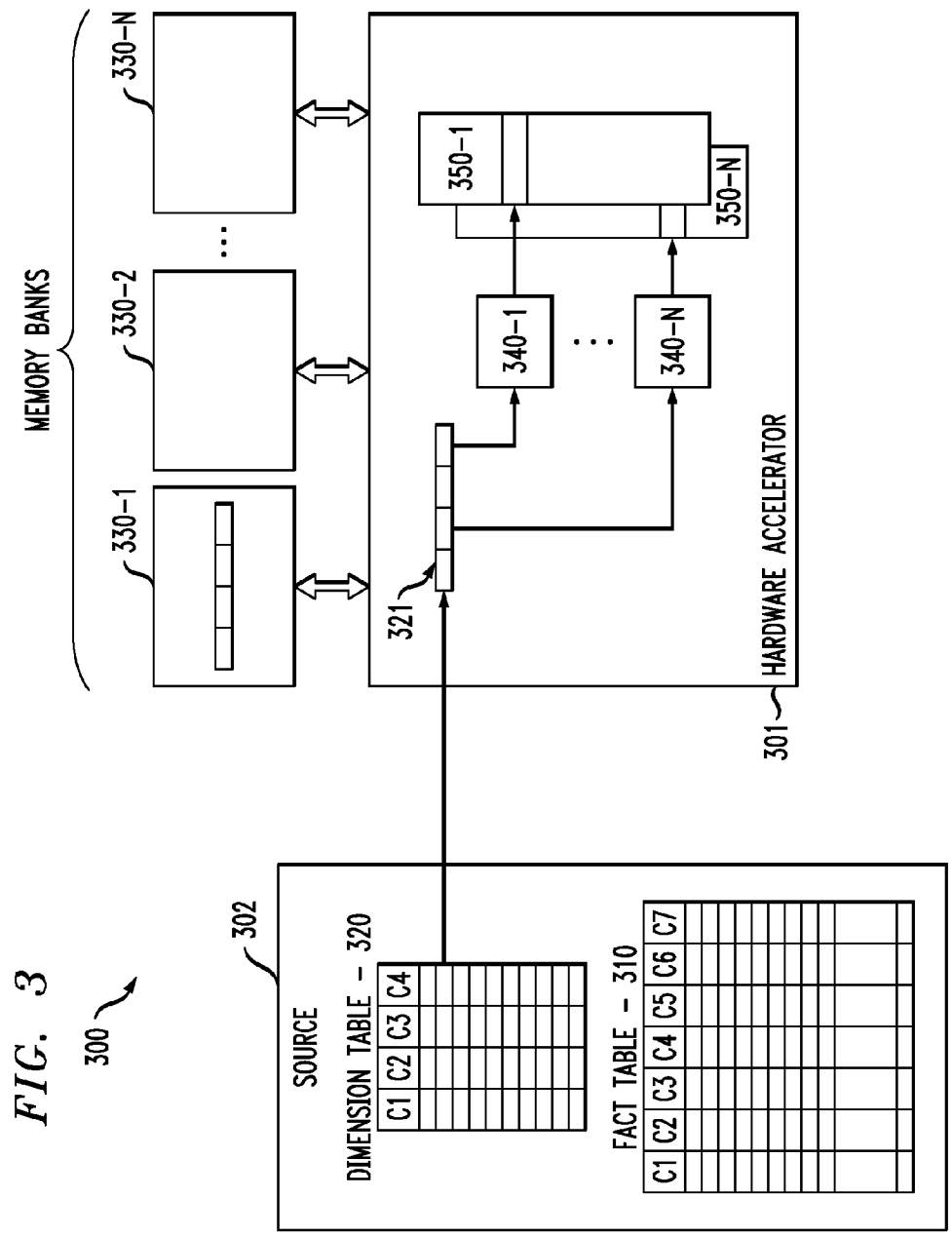
FIG. 3 illustrates a build phase, according to an embodiment of the invention.
Figure 4:
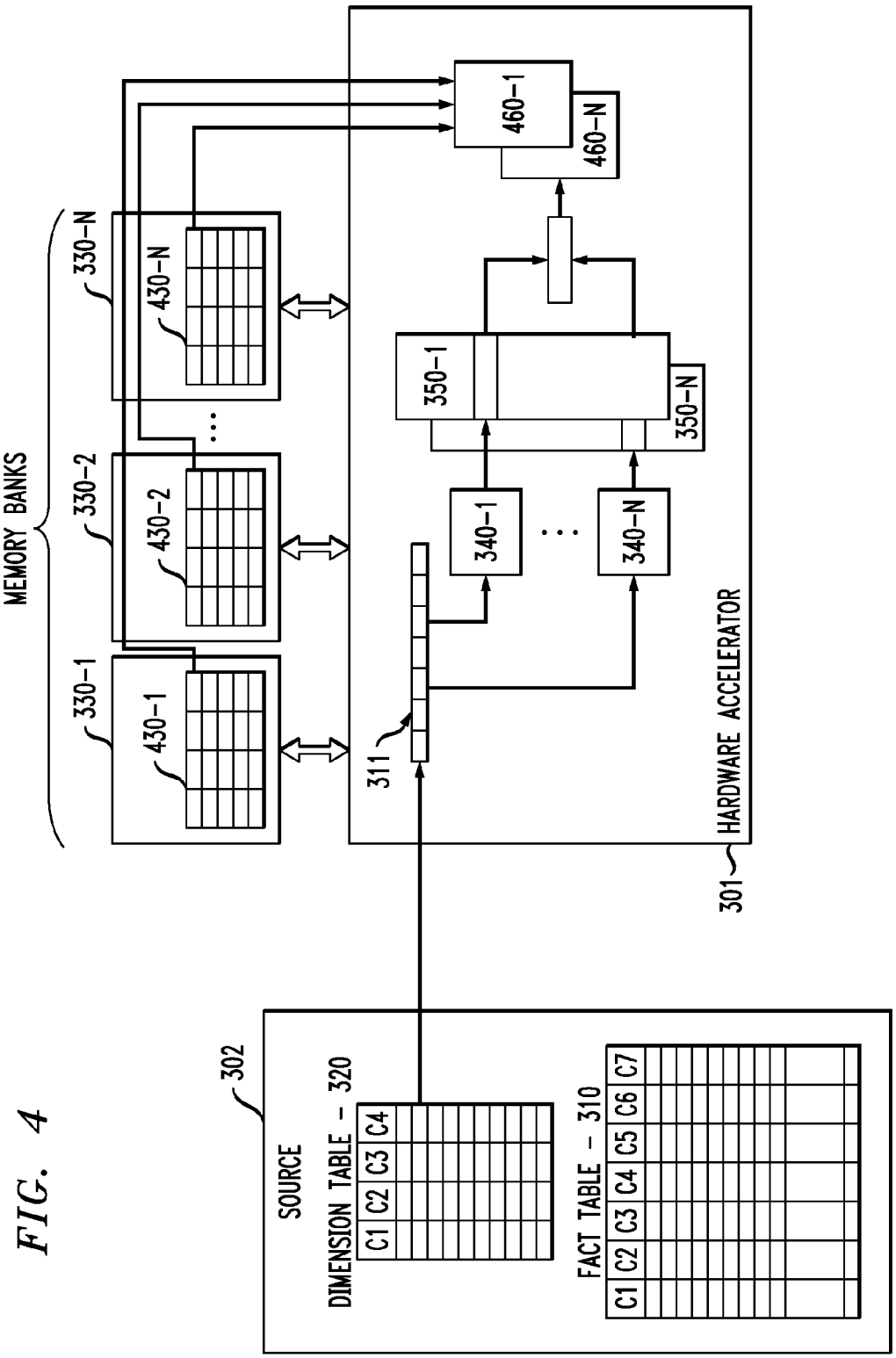
FIG. 4 illustrates a probe phase, according to an embodiment of the invention.

Hash join is performed in a two-phase process, a build phase and a probe phase. FIG. 3 illustrates a build phase 300 and FIG. 4 illustrates a probe phase 400, according to an embodiment of the invention. A source 302 has a fact table 310 and a dimension table 320. In this embodiment, the fact table 310 is shown to be the larger table and the dimension table is 320 is shown to be the smaller table. It is important to note that this is not necessarily the case, and that in other embodiments the fact table 310 may be smaller than the dimension table 320. In addition, although only a single fact table 310 and dimension table 320 are shown in FIGS. 3-4 for clarity, there may be multiple fact and/or dimension tables to be joined.

During the build phase 300, rows from the dimension table 320 are streamed to and processed in the hardware accelerator 301. FIG. 3 depicts a row 321 which is streamed through the hardware accelerator. For each row in the table, the join columns are hashed to form bit vectors 350. FIG. 3 shows join columns of row 321 which are hashed 340 and input into bit vectors 350. In this embodiment, rows are stored in the on-board memory banks 330. In other embodiments, rows may be stored in on-chip memory (not shown in FIG. 3). Note that the table which is streamed to and processed by the hardware accelerator 301 may be reorganized prior to streaming such that rows whose join column hash to the same value are grouped together. As rows are streamed in, columns of interest are hashed to set bits in the bit vectors 350. The resulting bit vectors 350 are stored in the on-chip memory (not shown in FIG. 3) of the hardware accelerator 301.

In some embodiments, parallel processing allows multiple join columns and/or table rows to be hashed substantially simultaneously. If available resources in the hardware accelerator do not permit all join columns and/or table rows to be hashed at once, they are hashed in sequential order. Note that this does not require a second pass through the table; it simply slows down the rate at which the table rows are processed. Parallel processing may be performed in one of or both of the build phase 300 and the probe phase 400.

In the embodiment shown in FIG. 3, rows such as row 321 are stored in memory banks 330. The rows are stored in particular memory banks at the index pointed to by the computed hash value of the row. For example, row 321 is stored in memory bank 330-1 in FIG. 3. Since hashing is not perfect, more than one row may hash to the same address. To enable parallel reads of multiple rows, each row which hashes to the same value is stored at the same address but in separate memory banks. If the number of rows stored at a particular address is more than the number of memory banks, then rows exceeding this number are stored at the next available address in sequential order. For example, if a given row has a hash value H and the number of possible hash values is N, the next sequential address is calculated by $H+(k/b)*N$, where k is the running count of the number of rows hashed to H and b is the number of memory banks. To compute the next address, the number of rows hashing to each hash value would also need to be stored, either in on-chip memory or in memory banks 330. In some embodiments, only the columns of interest are stored in memory banks 330 to save memory space required to store the rows. The columns of interest are defined as those needed to evaluate a join condition and those needed to be returned in a joined table.

During the probe phase 400, rows from the fact table 310 are streamed to the hardware accelerator 301. FIG. 4 shows only a single row 311 for clarity. As rows are streamed in, the columns of interest are hashed and the bit vectors 350 set in the build phase are probed. If the corresponding bits from the columns of interest of row 311 are set in bit vectors 350, the row 311 is selected for further processing; otherwise the row 311 is discarded. In some embodiments, selected rows may also be evaluated against local predicates prior to further processing. This advantageously reduces the number of rows that require further, more-expensive processing. Note that this requires a query to contain at least one local predicate in addition to the join predicate. It is important to note that this evaluation could also be performed prior to streaming the rows to the hardware accelerator 301. This evaluation could also be performed prior to hashing the columns of interest.

Rows which are selected for further processing are sent to matching units 460. The matching unit performs direct comparison between the columns of the current row and the corresponding columns of one or more rows from the dimension table. This step removes any false positives that result from imperfect hashing. The matching units 460 use the current hash value to read, from memory banks 330, all the rows of dimension table 320 which correspond to the current hash value. In each cycle, multiple rows from the dimension table 320 (up to one from each memory bank) are compared against the selected row from the fact table 310. If a match occurs, the join evaluates to true and the desired fields are selected from the row of the fact table 310 and the row of the dimension table 320 and are written to an output buffer (not shown in FIGS. 3-4). If a match does not occur, the join condition evaluates to false and the next rows are processed. The joined rows in the output buffer are then streamed from the hardware accelerator 301 to a system memory 102 or 202. In other embodiments, the joined rows in the output buffer are streamed directly to a CPU.

Figure 5:
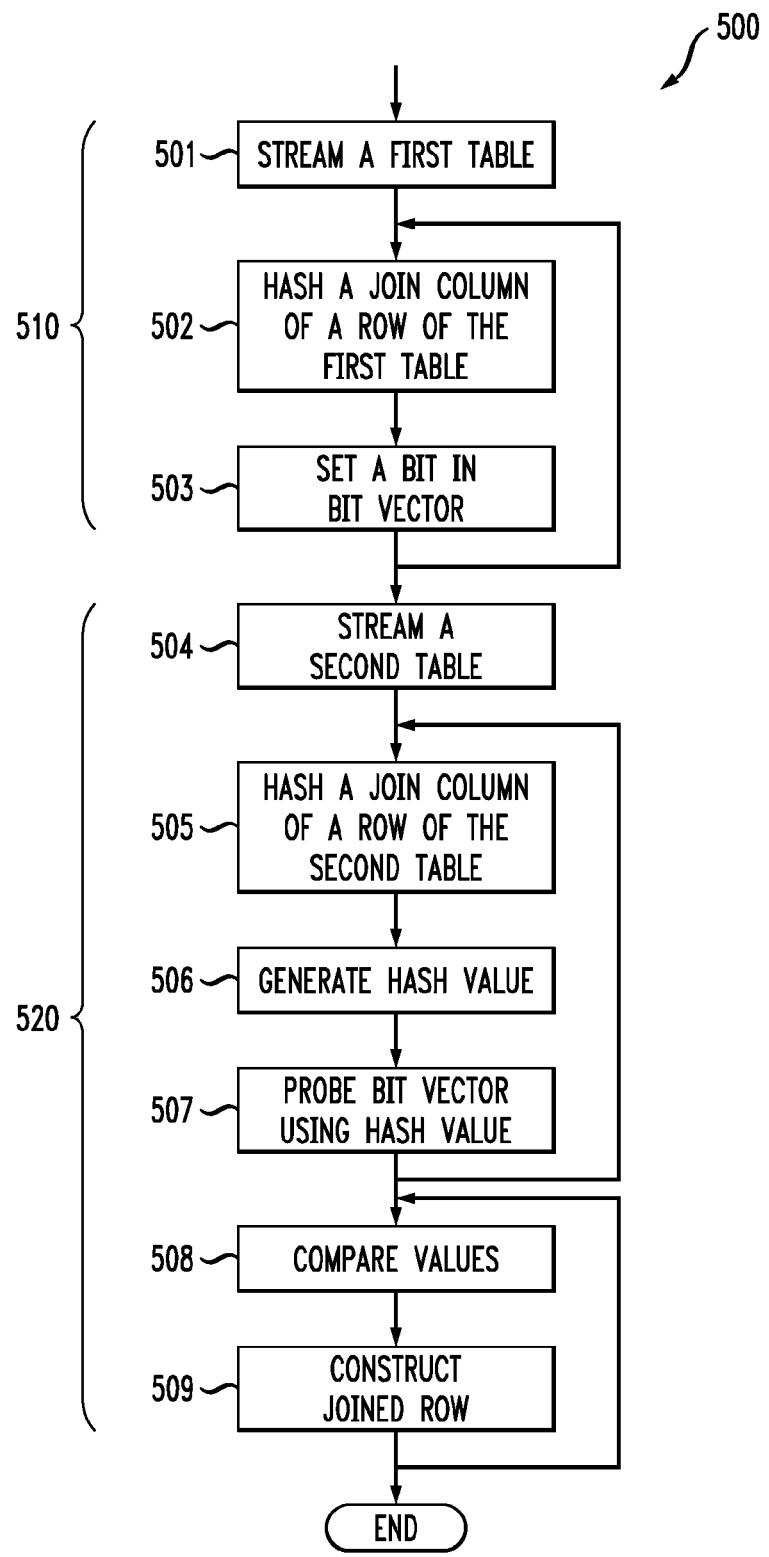
FIG. 5 illustrates a methodology of hardware-accelerated hash join, according to an embodiment of the invention.

FIG. 5 illustrates a methodology 500 of hardware-accelerated hash join. Portion 510 of FIG. 5 corresponds to the build phase and portion 520 corresponds to the probe phase. On receiving a join request or query, a first table is streamed 501 to a hardware accelerator. At least one join column of at least one row of the first table is hashed 502. The hash values obtained in 502 are used to set a bit in the bit vector 503. Steps 502 and 503 are repeated for each join column of each row of the first table. Once steps 502 and 503 have been performed for each join column of each row of the first table, the probe phase 520 begins. It is important to note that although FIG. 5 only illustrates a single table being streamed in the build phase 510, in certain embodiments multiple tables may be streamed to the hardware accelerator in the build phase 510.

The probe phase 520 begins by streaming a second table to the hardware accelerator. At least one join column of at least one row of the second table is hashed 505 to generate 506 a hash value. The bit vectors set in step 503 are then probed 507 using the hash value generated in step 506. As discussed above, if the bit positions of the hash values are set in the bit vector, the row is selected. Steps 505-507 are repeated for each join column of each row of the second table. For each row which results in hash matches for all of the join columns, direct comparison 508 of the column values of the first and second tables is performed. If the columns match, a joined row is constructed 509. Steps 508 and 509 are repeated for each row of the second table that results in hash matches for all of the join columns, and then the process ends.

It is important to note that one or more steps in FIG. 5 may be performed in parallel or in a different order. For example, steps 502 and 503 or steps 505-507 may be performed substantially simultaneously. Numerous other examples apply to the various steps in FIG. 5.

It is also important to note that in certain embodiments additional or different steps than those shown in FIG. 5 may be performed. For example, rows of the first and/or second table may be evaluated against local predicates before being streamed to the hardware accelerator. Rows of the first and/or second table may also be evaluated against local predicates after the first and/or second hashing step. In other configurations, a given one of the tables may be reorganized such that rows whose join column hash to the same value are grouped together prior to being streamed to and processed by the hardware accelerator.

In other embodiments one or both of steps 502 and 505 may be performed using hardware accelerated hashing. One or both of steps 502 and 505 may also be performed using multiple hash functions. The multiple hash functions may be a Bloom filter approach.

Figure 6:
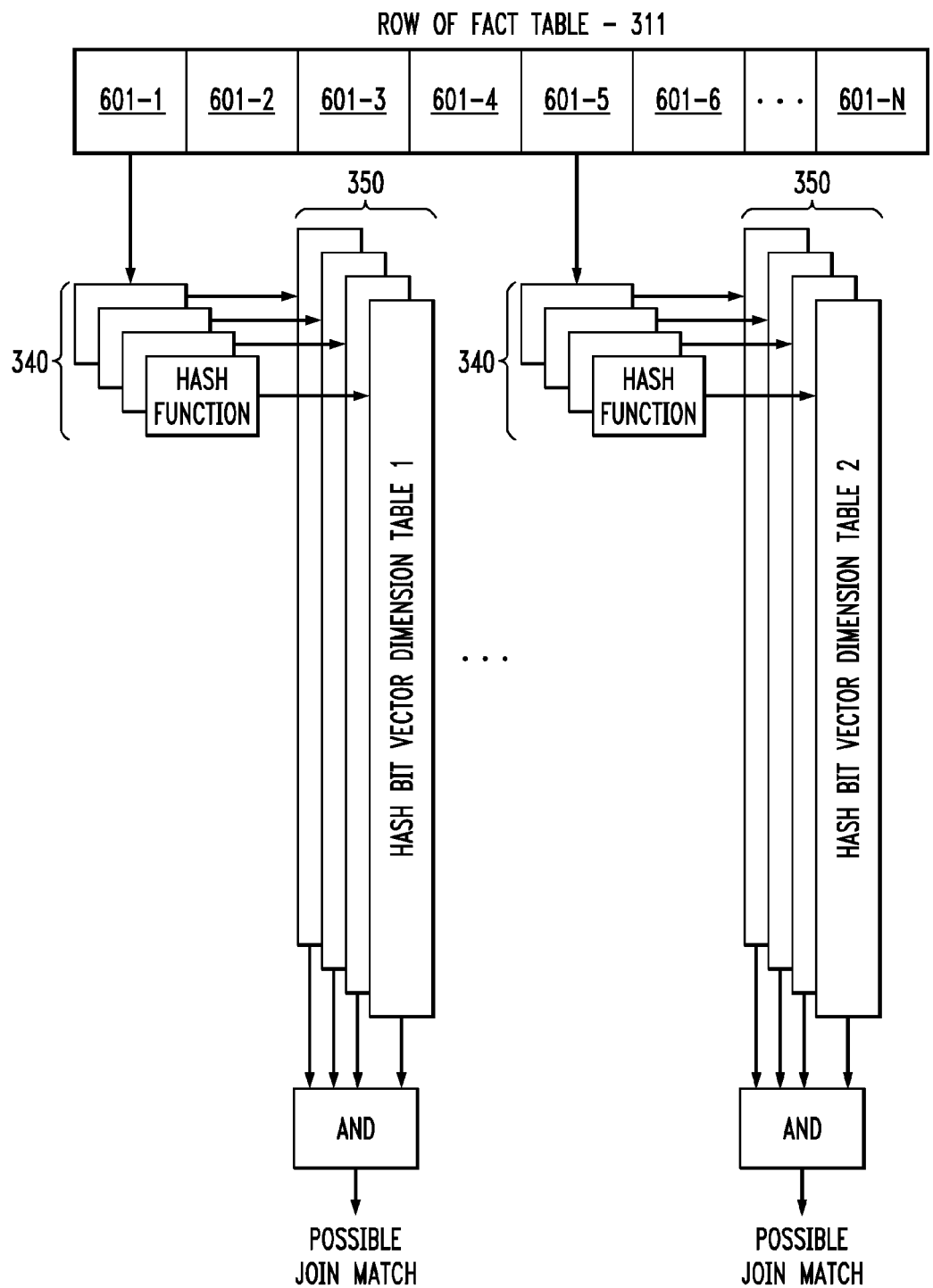
FIG. 6 illustrates a hash join, according to an embodiment of the invention.

FIG. 6 illustrates a hash join for a row of fact table 311. A particular row of fact table 311 contains one or more columns 601. In FIG. 6, columns 601-1 and 601-5 are join columns. It is important to note that the number of join columns is not limited to two, but may be any number up to N, N being the total number of columns in a row. Each of the join columns 601-1 and 601-5 is hashed using one or more hash functions 340. The use of one or more hash functions may constitute a Bloom filter approach. A hash match occurs when all the positions in the bit vector 350 pointed to by the hash values generated by the one or more hash functions 340 are set. When a hash match occurs, a possible join match exists. On determination of a match, further evaluations such as those based on local predicates may be performed. Subject to the result of these evaluations, a joined row is constructed. Although FIG. 6 illustrates an approach where a fact table is joined to two dimension tables, it is important to note that numerous other configurations are possible (i.e., one fact table and one dimension table, one fact table and three dimension tables, etc.).

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be but are not limited to, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-6, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-6, can also include, as described herein, providing a system, wherein the system includes distinct modules (e.g., modules comprising software, hardware or software and hardware).

Figure 7:
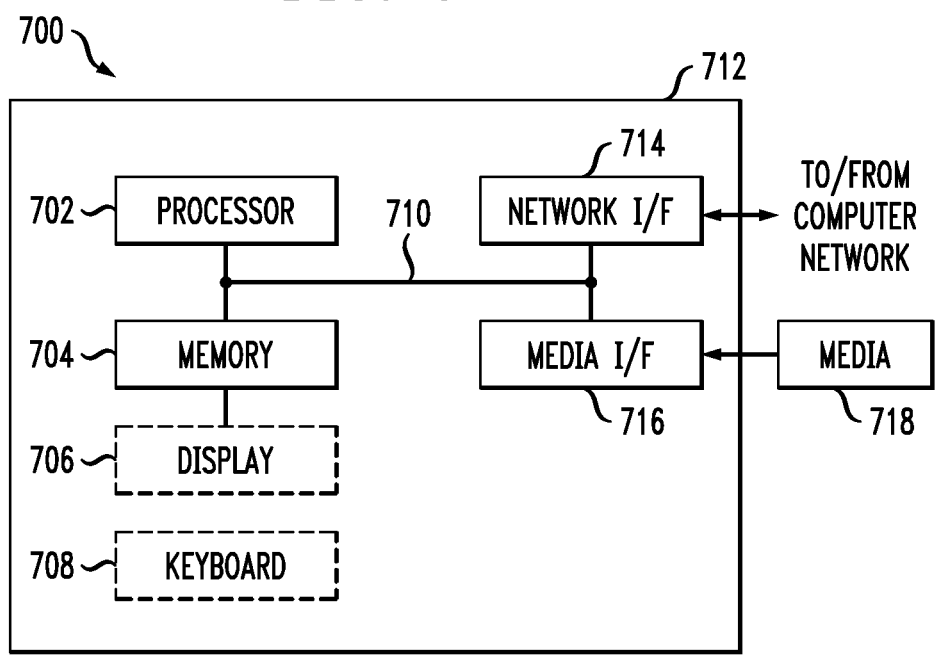
FIG. 7 illustrates a computing device in accordance with which one or more components/steps of techniques of the invention may be implemented, according to an embodiment of the invention.

One or more embodiments can make use of software running on a general purpose computer or workstation. With reference to FIG. 7, such an implementation 700 may employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to optionally include, for example, one or more mechanisms for inputting data to the processing unit (for example, keyboard or mouse), and one or more mechanisms for providing results associated with the processing unit (for example, display or printer).

The processor 702, memory 704, and input/output interface such as a display 706 and keyboard 708 can be interconnected, for example, via bus 710 as part of data processing unit 712. Suitable interconnections, for example, via bus 710, can also be provided to a network interface 714, such as a network card, which can be provided to interface with a computer network, and to a media interface 716, such as a diskette or CD-ROM drive, which can be provided to interface with media 718.

A data processing system suitable for storing and/or executing program code can include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 708 for making data entries; display 706 for viewing data; a pointing device for selecting data; and the like) can be coupled to the system either directly (such as via bus 710) or through intervening I/O controllers (omitted for clarity).

Network adapters such as a network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 712 as shown in FIG. 7) running a server program. It will be understood that such a physical server may or may not include a display and keyboard. Further, it is to be understood that components may be implemented on one server or on more than one server.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
performing a hash-join operation in a hardware accelerator responsive to receiving, at a source comprising at least one database, a request to perform the hash join operation;
wherein performing the hash-join operation in the hardware accelerator comprises the steps of:
processing a first table comprising one or more rows;
hashing at least one join column in at least one of the one or more rows of the first table to set at least one bit in at least one bit vector;
storing in a memory of the hardware accelerator each of the rows of the first table hashing to the same hash value;
processing a second table comprising one or more rows;
hashing at least one join column in at least one of the one or more rows of the second table to generate at least one hash value;
probing the at least one bit vector using the at least one hash value; and
constructing a joined row responsive to the probing step;
wherein each of the rows of the first table hashing to the same hash value is stored in a separate memory bank of the memory at a first address corresponding to the hash value; and
wherein when a first memory bank of the memory is full, subsequent rows of the first table hashing to the bit vector corresponding to the first address are stored in a second memory bank at a second address, the second address being the next sequential address.

2. The method of claim 1, wherein the hardware accelerator is a field programmable gate array (FPGA).

3. The method of claim 1, wherein the first table is stored in a memory of the hardware accelerator.

4. The method of claim 1, wherein the at least one bit vector is stored in a memory of the hardware accelerator.

5. The method of claim 1, wherein the hashing, probing and row-construction steps are performed in a single pass through the second table.

6. The method of claim 1, wherein the row-construction step utilizes local predicate evaluation on the second table.

7. The method of claim 1, wherein at least one of the hashing steps is performed using hardware accelerated hashing.

8. The method of claim 1, wherein at least one of the hashing steps is performed using multiple hash functions.

9. The method of claim 8, wherein the multiple hash functions comprise a Bloom filter approach.

10. The method of claim 1, wherein two or more of the join columns in a row of at least one of the first table and the second table are hashed in parallel.

11. The method of claim 1, wherein two or more of the rows of at least one of the first table and the second table are hashed in parallel.

12. The method of claim 1, wherein the row-construction step is performed on one or more rows of the second table in parallel.

13. The method of claim 1, wherein the probing step further comprises determining if the bit position of the at least one hash value is set in at least one bit vector, and responsive to the determination selecting the row of the second table corresponding to the at least one hash value for the row-construction step.

14. The method of claim 13, wherein the row of the second table is evaluated using local predicates before being selected for the row-construction step.

15. The method of claim 1, wherein the step of processing a first table comprising one or more rows comprises processing two or more tables comprising one or more rows.

16. The method of claim 1, wherein the joined row is output to a memory.

17. A computer-readable storage medium comprising executable program code for implementing the method of claim 1.

18. An apparatus comprising:
a hardware accelerator comprising a matching unit and at least one memory bank, the hardware accelerator being operative to perform a hash-join operation responsive to receiving, at a source comprising at least one database, a request to perform the hash-join operation;
wherein the hardware accelerator is operative to perform the hash-join operation by:
processing a first table comprising one or more rows from a memory;
hashing at least one join column in at least one of the one or more rows of the first table to set at least one bit in at least one bit vector;
storing in memory banks of the hardware accelerator each of the rows of the first table hashing to the same hash value;
processing a second table comprising one or more rows from the memory;
hashing at least one join column in at least one of the one or more rows of the second table to generate at least one hash value;
probing the at least one bit vector using the at least one hash value;
constructing a joined row responsive to the probing step; and
outputting the joined row to the memory;
wherein each of the rows of the first table hashing to the same hash value is stored in a separate memory bank of the hardware accelerator at a first address corresponding to the hash value; and
wherein when a first memory bank of the hardware accelerator is full, subsequent rows of the first table hashing to the bit vector corresponding to the first address are stored in a second memory bank of the hardware accelerator at a second address, the second address being the next sequential address.

19. The apparatus of claim 18, wherein the hardware accelerator is a field programmable gate array (FPGA).

20. An apparatus comprising:
a processor coupled to a memory and operative to:
receive a request to perform a hash-join operation at a source comprising at least one database;
offload the request to perform the hash-join operation to a hardware accelerator; and
read a joined row from the memory;
wherein the joined row is constructed by the hardware accelerator;
wherein the hardware accelerator is operative to perform the hash-join operation by:
processing a first table comprising one or more rows from the memory;
hashing at least one join column in at least one of the one or more rows of the first table to set at least one bit in at least one bit vector;
storing in a hardware accelerator memory each of the rows of the first table hashing to the same hash value;
processing a second table comprising one or more rows from the memory;

hashing at least one join column in at least one of the one or more rows of the second table to generate at least one hash value;
probing the at least one bit vector using the at least one hash value;
constructing a joined row responsive to the probing step; and
outputting the joined row to the memory;
wherein each of the rows of the first table hashing to the same hash value is stored in a separate memory bank of the hardware accelerator memory at a first address corresponding to the hash value; and
wherein when a first memory bank of the hardware accelerator memory is full, subsequent rows of the first table hashing to the bit vector corresponding to the first address are stored in a second memory bank of the hardware accelerator at a second address, the second address being the next sequential address.

* * * * *